US012634259B2

(12) United States Patent
Wu

(10) Patent No.: US 12,634,259 B2
(45) Date of Patent: May 19, 2026

(54) SYSTEMS AND METHODS FOR ENHANCED ZTNA SECURITY

(71) Applicant: Fortinet, Inc., Sunnyvale, CA (US)

(72) Inventor: Weining Wu, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 423 days.

(21) Appl. No.: 17/980,232

(22) Filed: Nov. 3, 2022

(65) Prior Publication Data

US 2024/0154938 A1 May 9, 2024

(51) Int. Cl.
*H04L 9/40* (2022.01)

(52) U.S. Cl.
CPC ...... *H04L 63/0236* (2013.01); *H04L 63/0876* (2013.01); *H04L 63/20* (2013.01)

(58) Field of Classification Search
CPC . H04L 63/0236; H04L 63/0876; H04L 63/20; H04L 63/101
See application file for complete search history.

(56) References Cited

U.S. PATENT DOCUMENTS

| | | | |
|---|---|---|---|
| 7,069,330 B1 | 6/2006 | McArdle | |
| 10,320,813 B1 | 6/2019 | Ahmed | |
| 11,075,923 B1 | 7/2021 | Srinivasan | |
| 11,456,894 B1 | 9/2022 | Sundararajan | |
| 11,546,257 B1 | 1/2023 | Gupta | |
| 11,563,601 B1 | 1/2023 | K S | |
| 11,663,030 B2 * | 5/2023 | Kaimal ............... H04L 67/1095 |
| | | | 713/168 |

| | | |
|---|---|---|
| 12,149,540 B2 | 11/2024 | May |
| 2006/0020698 A1 | 1/2006 | Whipple |
| 2006/0026682 A1 | 2/2006 | Zakas |
| 2007/0061575 A1 | 3/2007 | Bennett |
| 2007/0091861 A1 | 4/2007 | Gupta |
| 2016/0006661 A1 | 1/2016 | Wei |
| 2016/0218947 A1 | 7/2016 | Hughes |
| 2016/0269179 A1 | 9/2016 | White |
| 2018/0032372 A1 | 2/2018 | Devendran |
| 2018/0103010 A1 | 4/2018 | Diaz |
| 2019/0207844 A1 | 7/2019 | Kodavanty |
| 2020/0014615 A1 | 1/2020 | Michael |
| 2020/0296026 A1 | 9/2020 | Michael |
| 2020/0382537 A1 | 12/2020 | Compton |
| 2021/0234860 A1 * | 7/2021 | Bansal .................. H04W 12/37 |
| 2021/0258186 A1 | 8/2021 | Tokunaga et al. |
| 2021/0281576 A1 | 9/2021 | Sharavan |
| 2021/0377109 A1 | 12/2021 | Galchenko |
| 2022/0029988 A1 | 1/2022 | Levin |
| 2022/0052928 A1 | 2/2022 | Sundararajan |
| 2022/0150134 A1 | 5/2022 | Ewert |

(Continued)

FOREIGN PATENT DOCUMENTS

WO        2012164336 A1    12/2012

OTHER PUBLICATIONS

Zero Trust Architecture (ZTA): A Comprehensive Survey, Syed et al, Jan. 2022 (Year: 2022).*

(Continued)

*Primary Examiner* — Jahangir Kabir

(74) *Attorney, Agent, or Firm* — Jaffery Watson Hamilton & DeSanctis LLP

(57)        ABSTRACT

Various embodiments provide systems and methods for enhancing the security of a ZTNA connection.

20 Claims, 5 Drawing Sheets

(56) References Cited

U.S. PATENT DOCUMENTS

| | | | |
|---|---|---|---|
| 2022/0209990 A1 | 6/2022 | Dillon | |
| 2022/0329565 A1 | 10/2022 | Jiang | |
| 2022/0345491 A1 | 10/2022 | Luo | |
| 2023/0017423 A1 | 1/2023 | Guntupalli | |
| 2023/0028872 A1 | 1/2023 | Ramaswamy | |
| 2023/0171280 A1 | 6/2023 | Bansal | |
| 2023/0188505 A1* | 6/2023 | Jensen | H04L 63/107 |
| | | | 726/14 |
| 2023/0254141 A1 | 8/2023 | Hudon-Voyer et al. | |
| 2024/0022555 A1 | 1/2024 | Kolkara | |
| 2024/0114036 A1 | 4/2024 | May | |
| 2024/0196211 A1 | 6/2024 | Ullah | |

OTHER PUBLICATIONS

Notice of Allowance for U.S. Appl. No. 17/958,608, mailed Jul. 24, 2024, 9 pages.
Office Action for U.S. Appl. No. 17/958,608, mailed Jun. 28, 2024, 9 pages.
U.S. Appl. No. 17/958,616, filed Oct. 3, 2022.
U.S. Appl. No. 17/980,246, filed Nov. 3, 2022.
U.S. Appl. No. 17/958,608, filed Oct. 3, 2022.
Office Action for U.S. Appl. No. 18/817,521 Nov. 20, 2025, 14 pages.

* cited by examiner

100

400

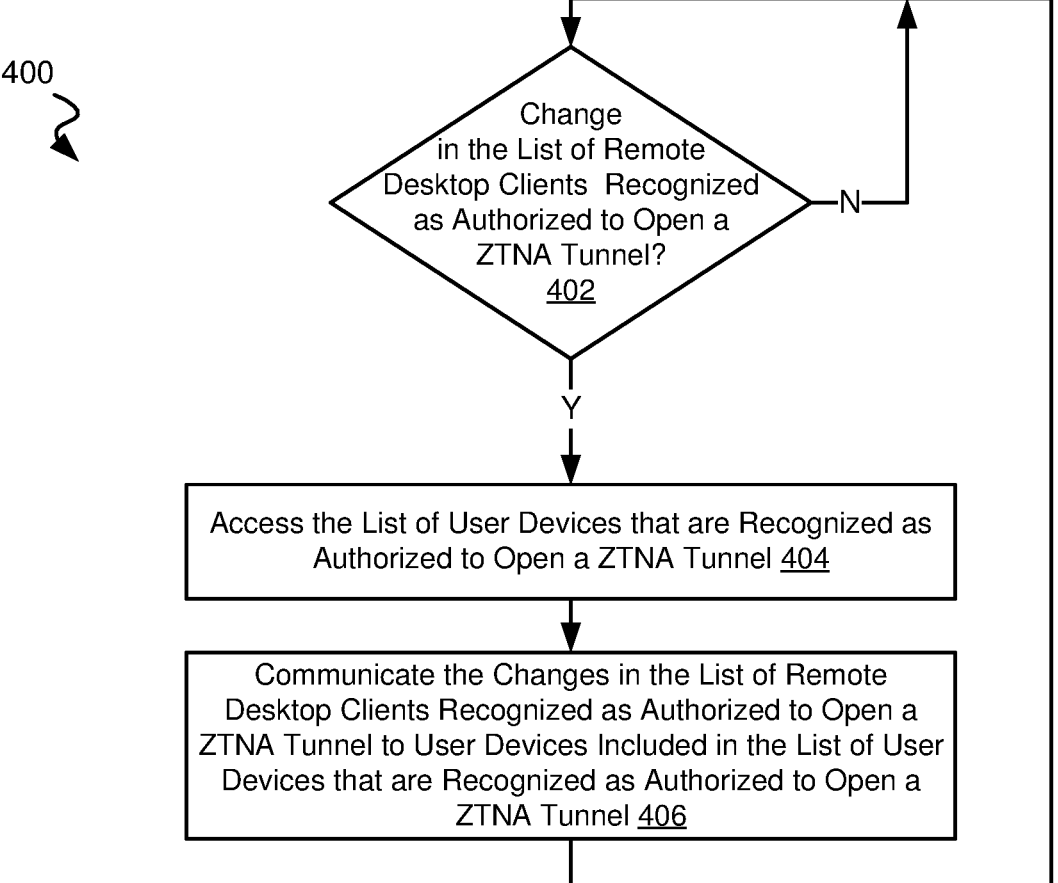

Change in the List of Remote Desktop Clients Recognized as Authorized to Open a ZTNA Tunnel?
402

N

Y

Access the List of User Devices that are Recognized as Authorized to Open a ZTNA Tunnel 404

Communicate the Changes in the List of Remote Desktop Clients Recognized as Authorized to Open a ZTNA Tunnel to User Devices Included in the List of User Devices that are Recognized as Authorized to Open a ZTNA Tunnel 406

FIG. 4

SYSTEMS AND METHODS FOR ENHANCED ZTNA SECURITY

COPYRIGHT NOTICE

FIELD

Embodiments discussed generally relate to systems and methods for securing network access, and more particularly to systems and methods for enhancing security of a ZTNA network access.

BACKGROUND

Zero Trust Network Access (ZTNA) is a communication protocol that allows only a limited number of pre-defined source nodes to access a network. Implementing such a ZTNA approach offers a significant improvement in security compared to standard firewall approaches that generally allow access limited only to some indication of a potential threat. While such a ZTNA approach offers heightened security, hackers are always working to exploit weaknesses.

Hence, there exists a need in the art for advanced approaches for enhancing security of a ZTNA network communication.

SUMMARY

Various embodiments provide systems and methods for enhancing security of a ZTNA network access.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIG. 4 is a flow diagram showing a method in accordance with some embodiments for communicating changes in authorized remote desktop clients to user devices included in a list of user devices that are recognized as authorized to open a ZTNA tunnel.

DETAILED DESCRIPTION

Figure 1A:
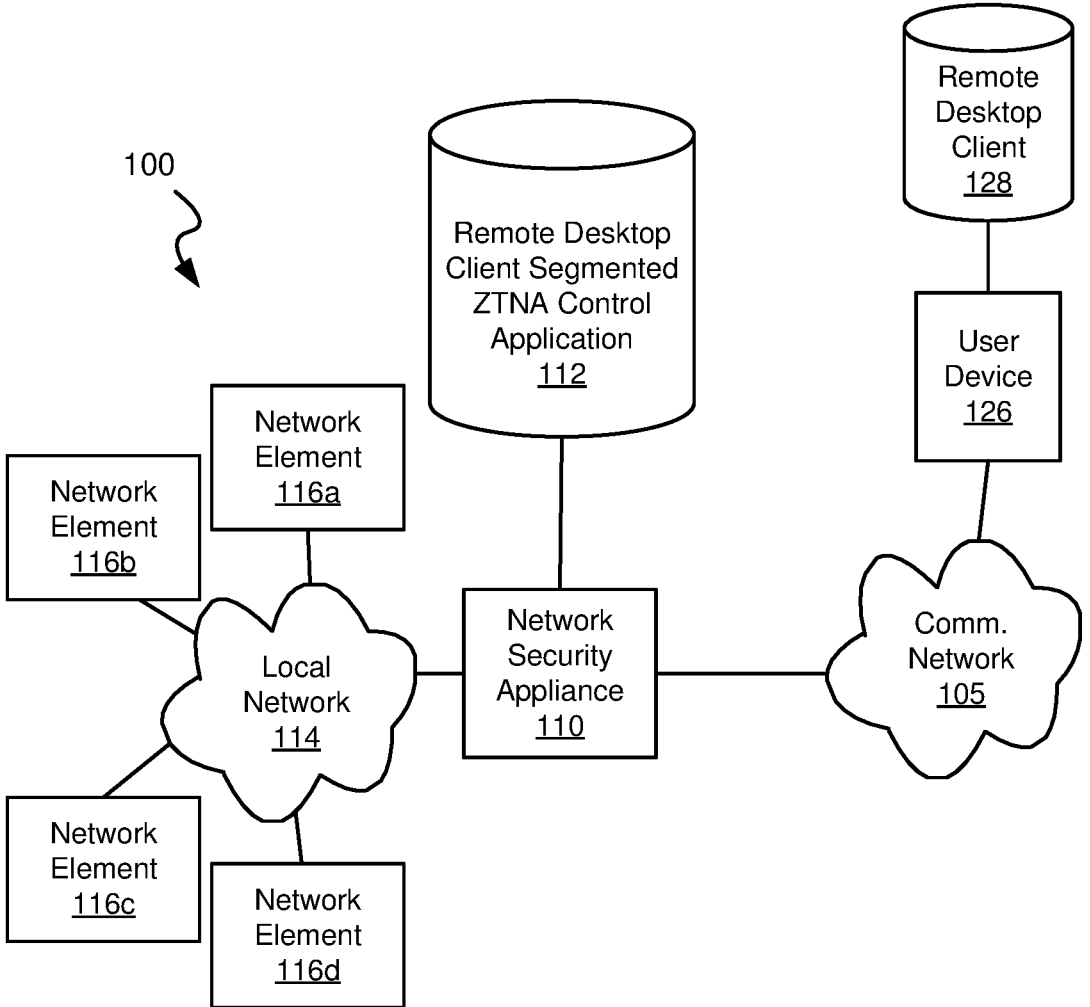
FIGS. 1A-1C illustrate a network architecture including a remote desktop client segmented ZTNA control application.

Various embodiments provide systems and methods for enhancing security of a ZTNA network access.

In a typical ZTNA implementation, a remote desktop client executing on a user device requests access to a secured network by providing an indication of the user device to a network security appliance set up to protect the secured network. In turn, the network security appliance determines whether the user device identified in the received request is one of the finite number of devices allowed by ZTNA policies programmed into the network security appliance. Where it is one of the allowed devices, a ZTNA tunnel is opened between the user device and the secured network through which network communications are allowed to proceed. It has been found that there is a potential for a malicious actor to gain unauthorized access to the user device and to exploit a vulnerability in the remote desktop client to access the secure network. In such a case, the network security appliance would allow network communications via a ZTNA tunnel because the user device is recognized as an allowed device.

Various embodiments disclosed herein address this vulnerability by limiting applications on the user device that may be used to establish a ZTNA tunnel between the user device and the secured network. In some embodiments, a ZTNA tunnel is only allowed when the remote desktop client is provided by a defined supplier and is of a particular version or later. Such an approach allows for centralized control of network security at the network security appliance, with user messaging at the user device encouraging the user to change or update their remote desktop client when a vulnerability of an currently used remote desktop client is identified. In some embodiments, the ZTNA tunnel can be established by any remote desktop client as long as the particular remote desktop client is included in an enumerated list of remote desktop clients and versions maintained in the network security appliance. One remote desktop client of a first version number may be included as one entry in the list of remote desktop clients, and the same remote desktop client except with a second version number may be included as another entry in the list of remote desktop clients. In such embodiments the same remote desktop client of different version numbers are different remote desktop clients. By allowing use of a number of remote desktop clients, a user is free to choose the particular remote desktop client that they will use while at the same time providing the previously discussed enhancement to ZTNA network access.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "network accessible service" "or "network accessible process" may be any service or process accessible via a communication network. As an example, a network accessible service may be an audio communication and/or video communication service such as, for example, Zoom™ that allows two or more end users to communicate over a communication network. As another example, a network accessible service may be a word processing service such as, for example, Office365™. Based upon the disclosure provided herein, one of ordinary skill in the art will recognize a variety of network accessible services and/or network accessible processes that may be used in relation to different embodiments.

Example embodiments will now be described more fully hereinafter with reference to the accompanying drawings. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for enhancing the security of a zero trust network access (ZTNA) connection. Such methods include: maintaining, by a processing resource, a list of user devices recognized as authorized to open a ZTNA connection; maintaining, by the processing resource, a list of remote desktop clients recognized as authorized to open a ZTNA connection; receiving, by the processing resource, a request to establish a ZTNA connection from a user device; extracting from the request to establish a ZTNA connection, by the processing resource, a user device identification identifying the user device and a remote desktop client identification identifying a remote desktop client executing on the user device to effectuate the request to establish a ZTNA connection; and where the user device identification is included in the list of user devices recognized as authorized to open a ZTNA connection and the remote desktop client identification is included in the list of remote desktop clients recognized as authorized to open a ZTNA connection, establishing, by the processing resource, a ZTNA connection to the user device.

In some instances of the aforementioned embodiments, the list of remote desktop clients recognized as authorized to open a ZTNA connection includes a first remote desktop client of a first version, and the first remote desktop client of a second version. In various instances of the aforementioned embodiments, the methods further include comparing the remote desktop client identification with each entry in the list of remote desktop clients recognized as authorized to open a ZTNA connection, and/or comparing, by the processing resource, the user device with each entry in the list of user devices recognized as authorized to open a ZTNA connection.

In various instances of the aforementioned embodiments, the processing resource is included in a network security appliance. In some instances of the aforementioned embodiments, the methods further include: receiving, by the processing resource, a list of security approved remote desktop clients; and automatically changing, by the processing resource, at least one remote desktop client in the list of remote desktop clients recognized as authorized to open a ZTNA connection based upon a difference between the list of security approved remote desktop clients and the list of remote desktop clients recognized as authorized to open a ZTNA connection. In various instances of the aforementioned embodiments, the methods further include: receiving, by the processing resource, a list of security approved user devices; and automatically changing, by the processing resource, at least one user device in the list of user devices recognized as authorized to open a ZTNA connection based upon a difference between the list of security approved user devices and the list of user devices recognized as authorized to open a ZTNA connection.

Other embodiments provide systems for enhancing the security of a zero trust network access (ZTNA) connection. Such systems include: a processing resource and a non-transient computer readable medium coupled to the processing resource. The non-transient computer readable medium has stored therein instructions that when executed by the processing resource to perform the following method: maintaining a list of user devices recognized as authorized to open a ZTNA connection; maintaining a list of remote desktop clients recognized as authorized to open a ZTNA connection; receiving a request to establish a ZTNA connection from a user device; extracting from the request to establish a ZTNA connection a user device identification identifying the user device and a remote desktop client identification identifying a remote desktop client executing on the user device to effectuate the request to establish a ZTNA connection; and where the user device identification is included in the list of user devices recognized as authorized to open a ZTNA connection and the remote desktop client identification is included in the list of remote desktop clients recognized as authorized to open a ZTNA connection, establishing a ZTNA connection to the user device.

Yet other embodiments provide non-transient computer readable media having stored therein instructions that when executed by the processing resource cause the processing to perform the following method: maintaining a list of user devices recognized as authorized to open a ZTNA connection; maintaining a list of remote desktop clients recognized as authorized to open a ZTNA connection; receiving a request to establish a ZTNA connection from a user device; extracting from the request to establish a ZTNA connection a user device identification identifying the user device and a remote desktop client identification identifying a remote desktop client executing on the user device to effectuate the request to establish a ZTNA connection; and where the user device identification is included in the list of user devices recognized as authorized to open a ZTNA connection and the remote desktop client identification is included in the list of remote desktop clients recognized as authorized to open a ZTNA connection, establishing a ZTNA connection to the user device.

Turning to FIG. 1A, network architecture 100 is shown that includes a remote desktop client segmented ZTNA control application 112. In the context of network architecture 100, a number of network elements (e.g., a network element 116a, a network element 116b, a network element 116c, a network element 116d, and a user device 126) are coupled to respective networks (e.g., a local network 114 and a communication network 105). Local network 114 and communication network 105 may respectively be any type of communication network known in the art. Those skilled in the art will appreciate that, local network 114 and/or communication network 105 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

User device 126 may be any device that is capable of communicating via a communication network. As an example, user device may be a smart phone, tablet device, server, personal computer, or the like. Based upon the disclosure provided herein, one of ordinary skill in the art will recognize a number of user devices that may be used in relation to different embodiments. User device 126 is coupled to a computer readable storage medium having stored thereon a remote desktop client 128. Remote desktop client 128 is configured to open a ZTNA tunnel between the secured network protected by network security appliance 110 and user device 126. Remote desktop client 128 may be any application executable by user device 126 that is capable of establishing a remote communication link with a secured network.

Access to local network 114 is controlled by network security appliance 110. Network security appliance 110 is coupled to a computer readable storage medium having stored thereon remote desktop client segmented ZTNA control application 112. Remote desktop client segmented ZTNA control application 112 when executed by one or more processors included in network security appliance 110 provides at least four functions. The first function is that of maintaining a list of user devices that are recognized by network security appliance 110 in opening a ZTNA tunnel. This list of user devices may be updated as user devices are introduced to the system or deleted from the system. In some embodiments, this list of user devices is updated manually by a network administrator.

The second function is that of maintaining an enumerated list of remote desktop clients and versions thereof that are recognized by network security appliance 110 in opening a ZTNA tunnel. This list may be updated to include new remote desktop clients as they become available, and to eliminate remote desktop clients (or versions thereof) that are identified as having an exploitable security flaw. In some embodiments, this list of remote desktop clients (or versions thereof) is updated manually by a network administrator. In other embodiments, this list of remote desktop clients (and versions thereof) is updated automatically based upon input from an exploit reporting service. In yet other embodiments, this list of remote desktop clients (or versions thereof) is updated both manually by a network administrator and automatically based upon input from an exploit reporting service.

The third function is that of communicating a list of allowed remote desktop clients to user devices included in the aforementioned list of user devices recognized by network security appliance 110 in opening a ZTNA tunnel. The respective user devices use this information to stop an attempt to open a ZTNA tunnel when the remote desktop client on the user device is not included on the list of remote desktop clients (and versions thereof), and in some cases to cause an automatic update of the remote desktop client to a newer version that is included on the list.

The fourth function is that of determining whether a request for a ZTNA tunnel is from both: (a) a user device included in the list of user devices that are recognized by network security appliance 110 in opening a ZTNA tunnel, and (b) a remote desktop client is included in the list of remote desktop clients (and versions thereof). Where the request is from an authorized source (both user device and remote desktop client), network security appliance 110 opens the requested ZTNA tunnel and communications are allowed between the secured network and the user device.

Figure 1B:
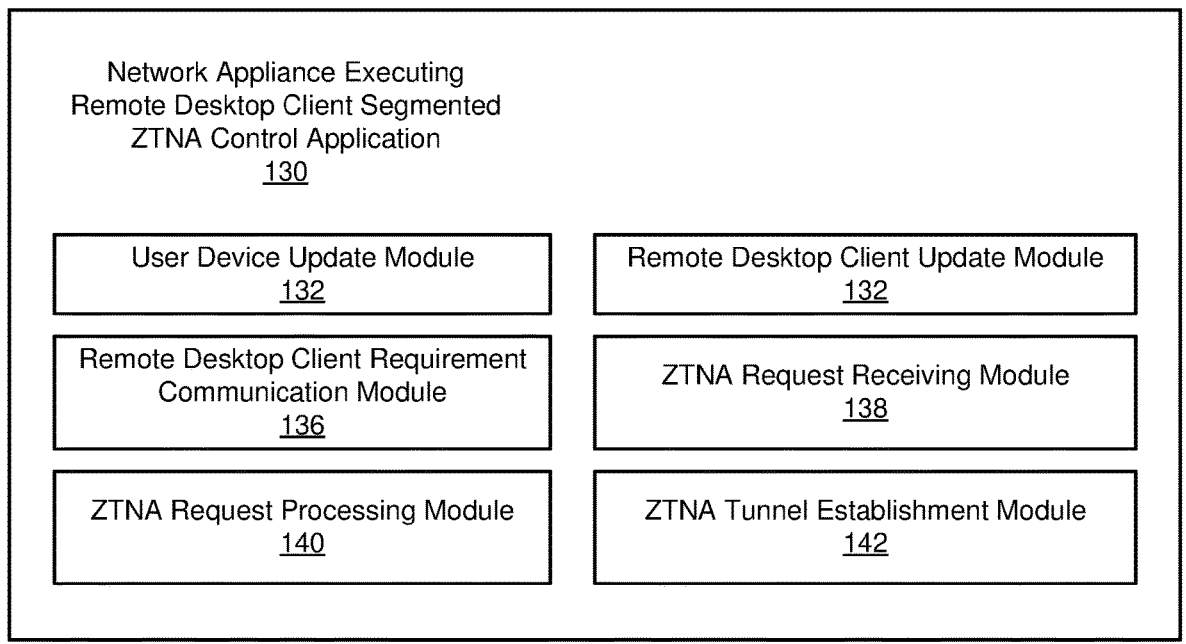

Turning to FIG. 1B, an example implementation of a network appliance executing remote desktop client segmented ZTNA control application 130 (e.g., network security appliance 110 executing remote desktop client segmented ZTNA control application 112) is shown in accordance with some embodiments. As shown in this example, remote desktop client segmented ZTNA control application 130 includes: a user device update module 132, a remote desktop client update module 134, a remote desktop client requirement communication module 136, a ZTNA request receiving module 138, a ZTNA request processing module 140, and a ZTNA tunnel establishment module 142.

User device update module 132 is configured to add and/or delete user devices recognized as authorized to open a ZTNA tunnel with the network protected by the network security appliance. As an example, a device may be added where a new employee is hired at a company and a user device is assigned to the new employee. The device may be added by, for example, a system administrator overseeing a network protected by the ZTNA process. Based upon the disclosure provided herein, one of ordinary skill in the art will recognize a variety of other mechanisms that may be used to add a user device in accordance with different embodiments. Where an additional device is to be added, a user device identification is added to the list of user devices that are recognized as authorized to open a ZTNA tunnel. Any information sufficient to identify the user device when it is requesting to open a ZTNA tunnel may be used in relation to different embodiments. Based upon the disclosure provided herein, one of ordinary skill in the art will recognize a variety of identifications that may be used in relation to different embodiments. Similarly, where a user device is to be deleted, the user device identification is deleted from the list of user devices that are recognized as authorized to open a ZTNA tunnel.

Remote desktop client update module 134 is configured to facilitate either automated or manual updating of a list of remote desktop clients recognized as authorized to open a ZTNA tunnel. For automated updates, remote desktop client update module 134 updates the list of remote desktop clients recognized as authorized to open a ZTNA tunnel based upon a list of security approved remote desktop clients received from a third party service or from another network security appliance in a network security fabric. Such a third party service may monitor security vulnerabilities in commercially available remote desktop clients. Where a security vulnerability exists with a remote desktop client, the third party service updates a list of allowable remote desktop clients to remove the vulnerable remote desktop client or version thereof. Similarly, the third party service adds updated vulnerable remote desktop clients and/or versions thereof as they become commercially available. Based upon the disclosure provided herein, one of ordinary skill in the art will recognize other sources of lists of security approved remote desktop clients that may be used in relation to different embodiments including, but not limited to, another network security appliance within a security fabric. When a list of security approved remote desktop clients is received, remote desktop client update module 134 modifies the list of remote desktop clients recognized as authorized to open a ZTNA tunnel to reflect the list of security approved remote desktop clients. This may include removing remote desktop clients from the list of remote desktop clients recognized as authorized to open a ZTNA tunnel that are not included in the received list of security approved remote desktop clients, and adding remote desktop clients to the list of remote desktop clients recognized as authorized to open a ZTNA tunnel that are included in the received list of security approved remote desktop clients.

Remote desktop client update module 134 may also receive a request from, for example, a network administrator to add or delete a remote desktop client or version thereof from the list of remote desktop clients recognized as authorized to open a ZTNA tunnel. When such a request is received, remote desktop client update module 134 adds a remote desktop client indicated in the request to the list of remote desktop clients recognized as authorized to open a ZTNA tunnel where an add is requested, or deletes a remote desktop client indicated in the request from the list of remote desktop clients recognized as authorized to open a ZTNA tunnel where a delete is requested.

Remote desktop client requirement communication module 136 is configured to communicate changes in the list of remote desktop clients recognized as authorized to open a ZTNA to user devices included in the list of user devices that are recognized as authorized to open a ZTNA tunnel. In turn, the respective user devices may use this updated list to assure that any attempt to open a ZTNA tunnel is done using only a remote desktop client or version thereof included in the received updated list. In some embodiments, where the remote desktop client currently deployed in a respective user device is not included in the received updated list, the user device may automatically update its remote desktop client to a newer version or different product.

ZTNA request receiving module 138 is configured to receive requests from user devices to open ZTNA tunnels. Such a request to open a ZTNA tunnel includes an indication of the user device originating the request and the remote desktop client and version thereof that is effectuating the request.

ZTNA request processing module 140 is configured to extract the user device identification and the remote desktop client identification is from the received request to open a ZTNA tunnel. In addition, ZTNA request processing module 140 is configured to access both the list of user devices that are recognized as authorized to open a ZTNA tunnel and the list of remote desktop clients including versions thereof that are recognized as authorized to open a ZTNA tunnel. Further, ZTNA request processing module 140 is configured to compare the user device identification extracted from the request to open the ZTNA tunnel with user device entries in the list of user devices that are recognized as authorized to open a ZTNA tunnel, and to compare the remote desktop client identification extracted from the request to open the ZTNA tunnel with remote desktop client entries in the list of remote desktop clients that are recognized as authorized to open a ZTNA tunnel. From this comparison, ZTNA request processing module 140 determines whether both the user device identification and the remote desktop client identification are included in the respective lists to which they were compared.

ZTNA tunnel establishment module 142 is configured to open a requested ZTNA tunnel where both the user device identification and the remote desktop client identification are included in the respective lists to which they were compared. Any approach know in the art for opening a ZTNA tunnel may be used in relation to the embodiments discussed herein.

Figure 1C:
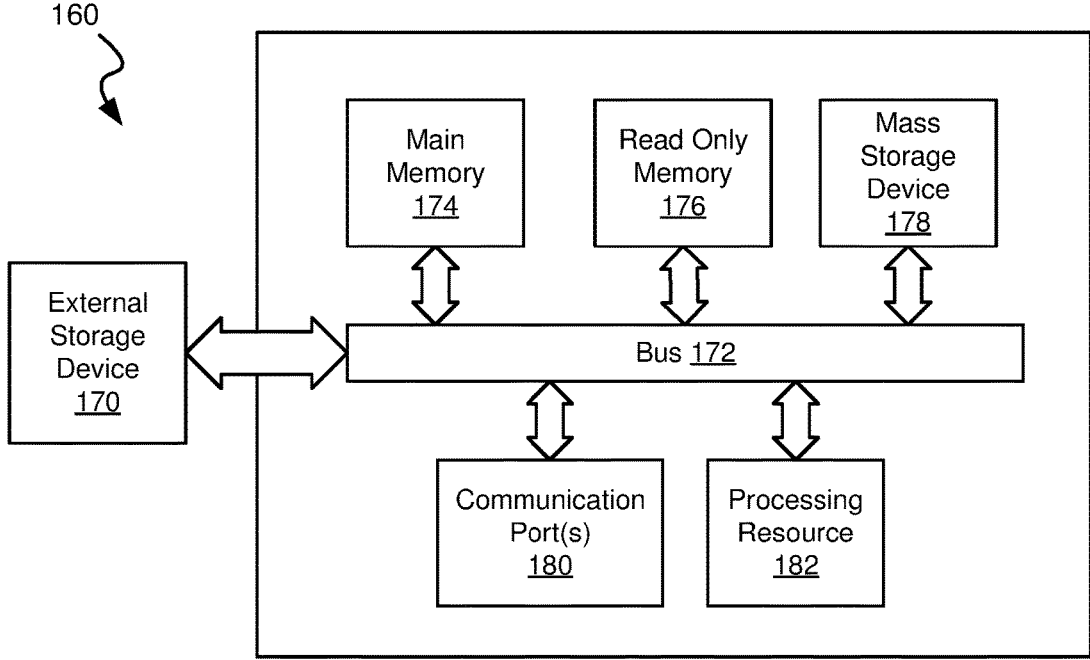

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc—Read Only Memory (CD-ROM), Compact Disc—Rewritable (CD-RW), Digital Video Disk—Read Only Memory (DVD-ROM). Components described above are meant only to show various possibilities. In no way should the aforementioned example computer systems limit the scope of the present disclosure.

Figure 2:
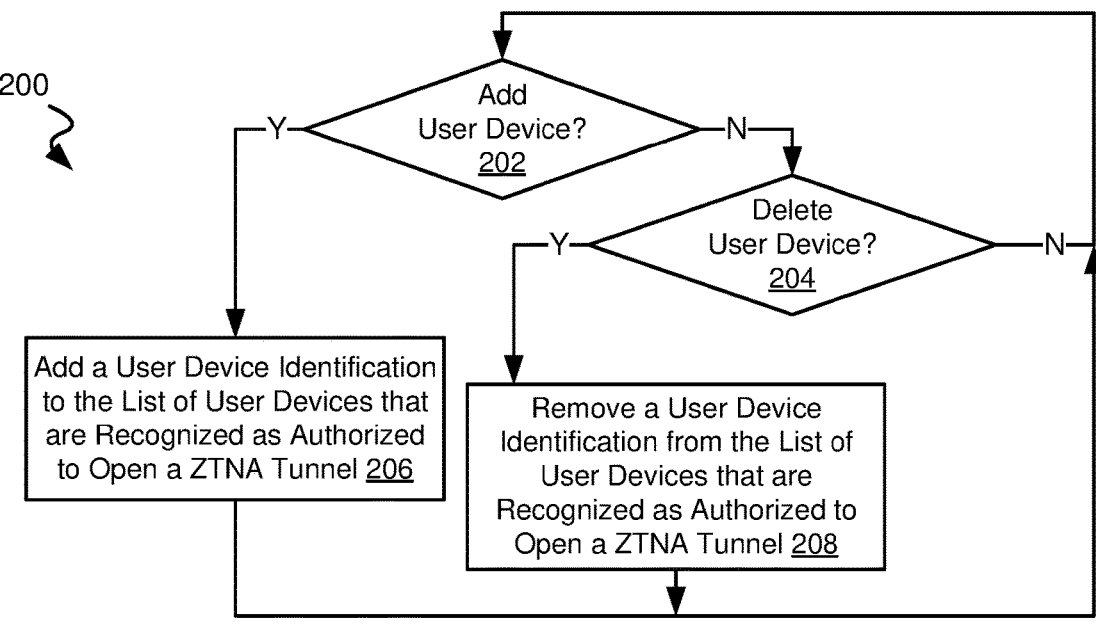
FIG. 2 is a flow diagram showing a method in accordance with some embodiments for updating a list of user devices that are recognized as authorized to open a ZTNA tunnel.

Turning to FIG. 2, a flow diagram 200 shows a method in accordance with some embodiments for updating a list of user devices that are recognized as authorized to open a ZTNA tunnel. Following flow diagram 200, it is determined whether a device is to be added that is recognized as being authorized to open a ZTNA tunnel (block 202). As an example, a device may be added where a new employee is hired at a company and a user device is assigned to the new employee. The device may be added by, for example, a system administrator overseeing a network protected by the ZTNA process. Based upon the disclosure provided herein, one of ordinary skill in the art will recognize a variety of other mechanisms that may be used to add a user device in accordance with different embodiments.

Where an additional device is to be added (block 202), a user device identification is added to the list of user devices that are recognized as authorized to open a ZTNA tunnel (block 206). Any information sufficient to identify the user device when it is requesting to open a ZTNA tunnel may be used in relation to different embodiments. Based upon the disclosure provided herein, one of ordinary skill in the art will recognize a variety of identifications that may be used in relation to different embodiments.

Alternatively, where no additional device is to be added (block 202), it is determined whether a device is to be removed from being recognized as being authorized to open a ZTNA tunnel (block 204). As an example, a device may be deleted where an employee leaves a company and a user device previously assigned to the new employee is unassigned. The device may be deleted by, for example, a system administrator overseeing a network protected by the ZTNA process. Based upon the disclosure provided herein, one of ordinary skill in the art will recognize a variety of other mechanisms that may be used to delete a user device in accordance with different embodiments. Where a user device is to be deleted (block 204), a user device identification is deleted from the list of user devices that are recognized as authorized to open a ZTNA tunnel (block 208).

Figure 3:
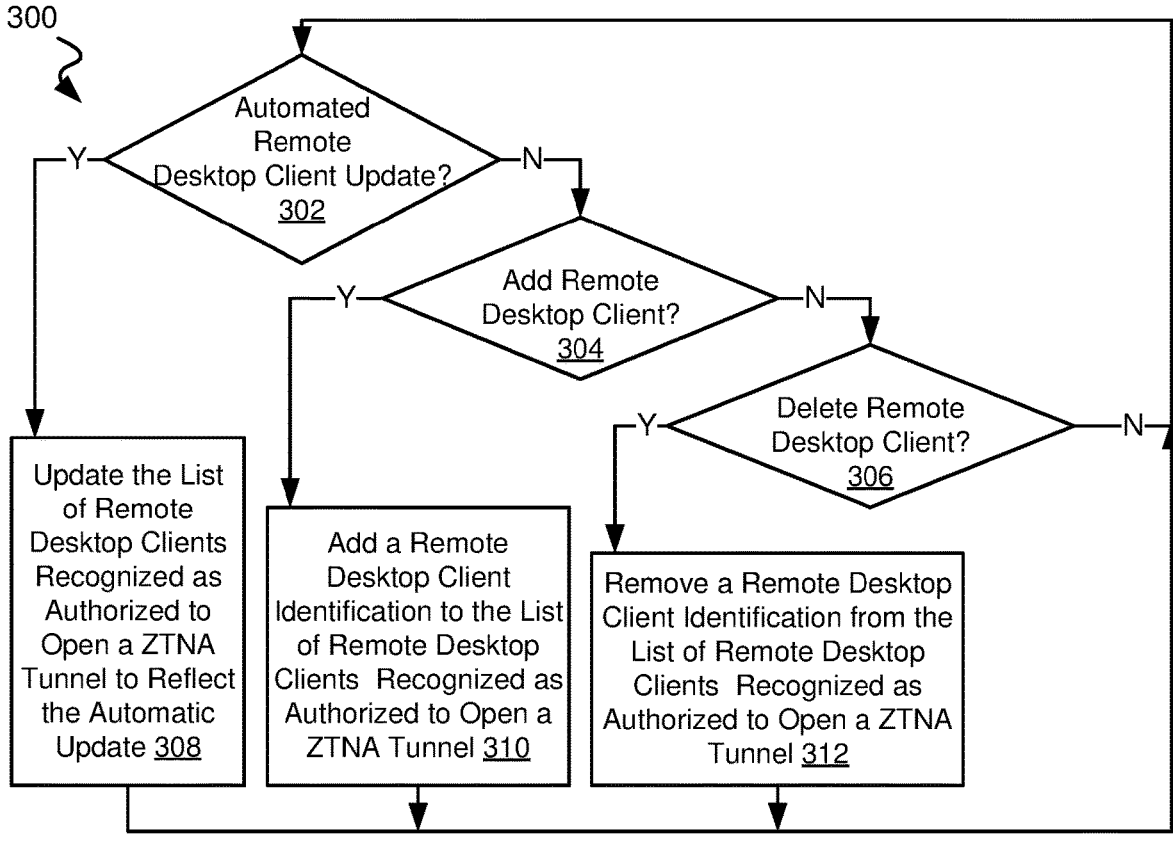
FIG. 3 is a flow diagram showing a method in accordance with some embodiments for updating a list of remote desktop clients that are recognized as authorized to open a ZTNA tunnel.

Turning to FIG. 3, a flow diagram 300 shows a method in accordance with some embodiments for updating a list of remote desktop clients that are recognized as authorized to open a ZTNA tunnel. Following flow diagram 300, it is determined whether an automated remote desktop client update is to be performed (block 302). An automated update may be received from, for example, a third party service that monitors security vulnerabilities in commercially available remote desktop clients. Where a security vulnerability exists with a remote desktop client, the third party service updates a list of allowable remote desktop clients to remove the vulnerable remote desktop client or version thereof. Similarly, the third party service adds updated vulnerable remote desktop clients and/or versions thereof as they become commercially available. Based upon the disclosure provided herein, one of ordinary skill in the art will recognize other sources of lists of security approved remote desktop clients that may be used in relation to different embodiments including, but not limited to, another network security appliance within a security fabric. The list of security approved remote desktop clients is provided occasionally, and when it is an automated remote desktop client update is to be performed (block 302).

When an automated remote desktop client update is to be performed (block 302), the list of security approved remote desktop clients is used to update the list of remote desktop clients recognized as authorized to open a ZTNA tunnel to reflect the received list of security approved remote desktop clients (block 308). This may include removing remote desktop clients from the list of remote desktop clients recognized as authorized to open a ZTNA tunnel that are not included in the received list of security approved remote desktop clients, and adding remote desktop clients to the list of remote desktop clients recognized as authorized to open a ZTNA tunnel that are included in the received list of security approved remote desktop clients.

Alternatively, when an automated remote desktop client update is not to be performed (block 302), it is determined whether a remote desktop client is to be manually added (block 304). Manually adding a remote desktop client may be done, for example, by a network administrator. Where a remote desktop client is to be manually added (block 304), the remote desktop client to be added is manually entered an included in the list of remote desktop clients recognized as authorized to open a ZTNA tunnel (block 310). It is determined whether a remote desktop client is to be manually deleted (block 306). Manually deleting a remote desktop client may be done, for example, by a network administrator. Where a remote desktop client is to be manually deleted (block 306), the remote desktop client to be deleted is manually removed from the list of remote desktop clients recognized as authorized to open a ZTNA tunnel (block 312).

Turning to FIG. 4, a flow diagram 400 shows a method in accordance with some embodiments for communicating changes in authorized remote desktop clients to user devices included in a list of user devices that are recognized as authorized to open a ZTNA tunnel. Following flow diagram 400, it is determined whether a change has occurred in the list of remote desktop clients recognized as authorized to open a ZTNA tunnel (block 402). Where a change has occurred (block 402), the list of user devices that are recognized as authorized to open a ZTNA tunnel is accessed (block 404), and either the updated list of remote desktop clients recognized as authorized to open a ZTNA or the changes to the list of remote desktop clients recognized as authorized to open a ZTNA is/are communicated to each user device included in the list of user devices that are recognized as authorized to open a ZTNA tunnel (block 406). This communication may be done using any mechanism for communication existing between the network security appliance and the respective users in the list of user devices that are recognized as authorized to open a ZTNA tunnel. When received by the user device, the user device updates its list and assures that any attempt to open a ZTNA tunnel is done using only a remote desktop client or version thereof included in the received updated list. Where the remote desktop client currently deployed in a respective user device is not included in the received updated list, the user device may automatically update its remote desktop client to a newer version or different product.

Figure 5:
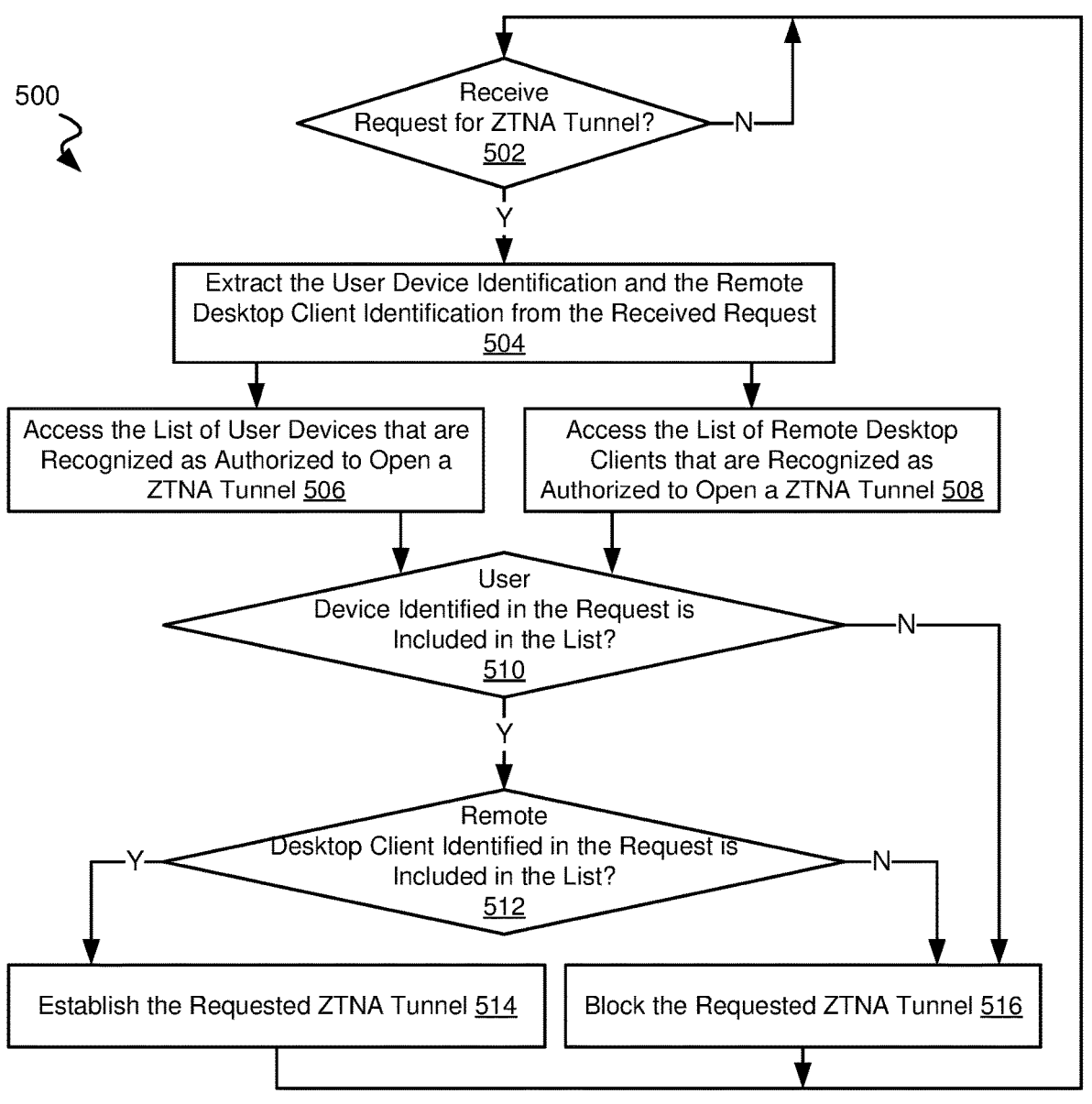
FIG. 5 is a flow diagram showing a method in accordance with some embodiments for establishing ZTNA tunnels based upon a combination of a user device identification and a remote desktop client identification.

Turning to FIG. 5, a flow diagram 500 shows a method in accordance with some embodiments for establishing ZTNA tunnels based upon a combination of a user device identification and a remote desktop client identification. Following flow diagram 500, it is determined whether a request to open a ZTNA tunnel has been received (block 502). Such a request to open a ZTNA tunnel includes an indication of the user device originating the request and the remote desktop client and version thereof that is effectuating the request. When a request to open a ZTNA tunnel has been received (block 502), the user device identification and the remote desktop client identification is extracted from the request (block 504).

The list of user devices that are recognized as authorized to open a ZTNA tunnel is accessed (block 560), and the list of remote desktop clients including versions thereof that are recognized as authorized to open a ZTNA tunnel is accessed (block 508). The user device identification extracted from the request to open the ZTNA tunnel is compared with user device entries in the list of user devices that are recognized as authorized to open a ZTNA tunnel, and the remote desktop client identification extracted from the request to open the ZTNA tunnel is compared with remote desktop client entries in the list of remote desktop clients that are recognized as authorized to open a ZTNA tunnel. From this comparison, it is determined whether both the user device identification and the remote desktop client identification are included in the respective lists to which they were compared (blocks 510, 512). Where both are found (blocks 510, 512), the requested ZTNA tunnel is established (block 514). Alternatively, where either the user device identification or the remote desktop client identification is/are not found, the requested ZTNA tunnel is blocked (block 516).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for enhancing the security of a zero trust network access (ZTNA) connection, the method comprising:

maintaining, by a processing resource, a list of user devices recognized as authorized to open a ZTNA connection;

maintaining, by the processing resource, a list of remote desktop clients recognized as authorized to open a ZTNA connection;

receiving, by the processing resource, a request to establish a ZTNA connection from a user device;

extracting from the request to establish a ZTNA connection, by the processing resource, a user device identification identifying the user device and a remote desktop client identification identifying a remote desktop client executing on the user device to effectuate the request to establish a ZTNA connection; and where the user device identification is included in the list of user devices recognized as authorized to open a ZTNA connection and the remote desktop client identification is included in the list of remote desktop clients recognized as authorized to open a ZTNA connection, establishing, by the processing resource, a ZTNA connection to the user device.

2. The method of claim 1, wherein the list of remote desktop clients recognized as authorized to open a ZTNA connection includes a first remote desktop client of a first version, and the first remote desktop client of a second version.

3. The method of claim 1, wherein the method further comprises:

comparing the remote desktop client identification with each entry in the list of remote desktop clients recognized as authorized to open a ZTNA connection.

4. The method of claim 1, wherein the method further comprises:

comparing, by the processing resource, the user device with each entry in the list of user devices recognized as authorized to open a ZTNA connection.

5. The method of claim 1, wherein the processing resource is included in a network security appliance.

6. The method of claim 1, wherein the method further comprises:

receiving, by the processing resource, a list of security approved remote desktop clients; and automatically changing, by the processing resource, at least one remote desktop client in the list of remote desktop clients recognized as authorized to open a ZTNA connection based upon a difference between the list of security approved remote desktop clients and the list of remote desktop clients recognized as authorized to open a ZTNA connection.

7. The method of claim 1, wherein the method further comprises:

receiving, by the processing resource, a list of security approved user devices; and automatically changing, by the processing resource, at least one user device in the list of user devices recognized as authorized to open a ZTNA connection based upon a difference between the list of security approved user devices and the list of user devices recognized as authorized to open a ZTNA connection.

8. A system for enhancing the security of a zero trust network access (ZTNA) connection, the system comprising:

a processing resource;

a non-transitory computer readable medium coupled to the processing resource and having stored therein instructions that when executed by the processing resource to perform the following method:

maintaining a list of user devices recognized as authorized to open a ZTNA connection;

maintaining a list of remote desktop clients recognized as authorized to open a ZTNA connection;

receiving a request to establish a ZTNA connection from a user device;

extracting from the request to establish a ZTNA connection a user device identification identifying the user device and a remote desktop client identification identifying a remote desktop client executing on the user device to effectuate the request to establish a ZTNA connection; and where the user device identification is included in the list of user devices recognized as authorized to open a ZTNA connection and the remote desktop client identification is included in the list of remote desktop clients recognized as authorized to open a ZTNA connection, establishing a ZTNA connection to the user device.

9. The system of claim 8, wherein the list of remote desktop clients recognized as authorized to open a ZTNA connection includes a first remote desktop client of a first version, and the first remote desktop client of a second version.

10. The system of claim 8, wherein the method further comprises:

comparing the remote desktop client identification with each entry in the list of remote desktop clients recognized as authorized to open a ZTNA connection.

11. The system of claim 8, wherein the method further comprises:

comparing the user device with each entry in the list of user devices recognized as authorized to open a ZTNA connection.

12. The system of claim 8, wherein the processing resource is included in a network security appliance.

13. The system of claim 8, wherein the method further comprises:

receiving a list of security approved remote desktop clients; and automatically changing at least one remote desktop client in the list of remote desktop clients recognized as authorized to open a ZTNA connection based upon a difference between the list of security approved remote desktop clients and the list of remote desktop clients recognized as authorized to open a ZTNA connection.

14. The system of claim 8, wherein the method further comprises:

receiving a list of security approved user devices; and automatically changing at least one user device in the list of user devices recognized as authorized to open a ZTNA connection based upon a difference between the list of security approved user devices and the list of user devices recognized as authorized to open a ZTNA connection.

15. A non-transitory computer readable medium having stored therein instructions that when executed by a processing resource cause the processing resource to perform the following method:

maintaining a list of user devices recognized as authorized to open a ZTNA connection;

maintaining a list of remote desktop clients recognized as authorized to open a ZTNA connection;

receiving a request to establish a ZTNA connection from a user device;

extracting from the request to establish a ZTNA connection a user device identification identifying the user device and a remote desktop client identification identifying a remote desktop client executing on the user device to effectuate the request to establish a ZTNA connection; and where the user device identification is included in the list of user devices recognized as authorized to open a ZTNA connection and the remote desktop client identification is included in the list of remote desktop clients recognized as authorized to open a ZTNA connection, establishing a ZTNA connection to the user device.

16. The non-transitory computer readable medium of claim 15, wherein the list of remote desktop clients recognized as authorized to open a ZTNA connection includes a first remote desktop client of a first version, and the first remote desktop client of a second version.

17. The non-transitory computer readable medium of claim 15, wherein the method further comprises:

comparing the remote desktop client identification with each entry in the list of remote desktop clients recognized as authorized to open a ZTNA connection.

18. The non-transitory t computer readable medium of claim 15, wherein the method further comprises:

comparing the user device with each entry in the list of user devices recognized as authorized to open a ZTNA connection.

19. The non-transitory computer readable medium of claim 15, wherein the method further comprises:

receiving a list of security approved remote desktop clients; and automatically changing at least one remote desktop client in the list of remote desktop clients recognized as authorized to open a ZTNA connection based upon a difference between the list of security approved remote desktop clients and the list of remote desktop clients recognized as authorized to open a ZTNA connection.

20. The non-transitory computer readable medium of claim 15, wherein the method further comprises:

receiving a list of security approved user devices; and automatically changing at least one user device in the list of user devices recognized as authorized to open a ZTNA connection based upon a difference between the list of security approved user devices and the list of user devices recognized as authorized to open a ZTNA connection.

* * * * *